United States Patent
Klimpel et al.

(10) Patent No.: US 9,266,601 B2
(45) Date of Patent: Feb. 23, 2016

(54) METHOD AND SYSTEM FOR EMERGENCY VENTILATION OF AN AIRCRAFT CABIN IN THE CASE OF A LEAK IN THE AREA OF AN AIR MIXER

(75) Inventors: Frank Klimpel, Naherfurth in Kayhude (DE); Rüdiger Schmidt, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 1100 days.

(21) Appl. No.: 13/126,544

(22) PCT Filed: Sep. 8, 2009

(86) PCT No.: PCT/EP2009/006510
§ 371 (c)(1),
(2), (4) Date: Aug. 26, 2011

(87) PCT Pub. No.: WO2010/057548
PCT Pub. Date: May 27, 2010

(65) Prior Publication Data
US 2012/0003908 A1  Jan. 5, 2012

Related U.S. Application Data

(60) Provisional application No. 61/116,676, filed on Nov. 21, 2008.

(30) Foreign Application Priority Data

Nov. 21, 2008  (DE) .......................... 10 2008 058 451

(51) Int. Cl.
*B64D 13/00* (2006.01)
*B64C 1/18* (2006.01)
(Continued)

(52) U.S. Cl.
CPC . *B64C 1/18* (2013.01); *B64D 13/02* (2013.01); *B64C 2001/009* (2013.01); *Y02T 50/44* (2013.01)

(58) Field of Classification Search
CPC ......... G01M 3/26; B64D 13/00; B64D 13/02; F05D 2220/50; F05D 2260/20; F05D 2260/96; B64C 1/18; B64C 2001/009; Y02T 50/44
USPC ............. 454/76, 40, 71, 72; 244/53 B, 118.5, 244/129.2; 60/782, 785, 795; 73/40
See application file for complete search history.

(56) References Cited

U.S. PATENT DOCUMENTS 2,691,134 A * 10/1954 Ford ............................... 324/694
2,853,874 A * 9/1958 Mennesson ...................... 73/40
(Continued)

FOREIGN PATENT DOCUMENTS

| CN | 101304920 | 11/2008 |
|---|---|---|
| DE | 102006016541 | 10/2007 |

(Continued)

OTHER PUBLICATIONS

Maylor, E.L., "Enhanced Emergency Smoke Venting," Federal Aviation Administration Technical Center Report DOT/FAA/CT—88/22, Jul. 1988, Prepared by Boeing; [retrieved on Nov. 16, 2013]; Retrieved from the Internet < URL: http://www.fire.tc.faa.gov/pdf/tn90-24.pdf >.*

(Continued)

*Primary Examiner* — Gregory Huson
*Assistant Examiner* — Dana Tighe
(74) *Attorney, Agent, or Firm* — Wood, Herron & Evans, LLP

(57) ABSTRACT

In a method for emergency ventilation of an aircraft cabin, a leak is detected in the area of an air mixer of an aircraft air conditioning system. An emergency air flap, which in a closed position prevents an air exchange between an aircraft area adjacent to the air mixer and the aircraft cabin, is controlled into an open position. Air from the aircraft area adjacent to the air mixer is conveyed through the open emergency air flap into the aircraft cabin.

12 Claims, 2 Drawing Sheets

(51) Int. Cl.
*B64D 13/02* (2006.01)
*B64C 1/00* (2006.01)

(56) References Cited

U.S. PATENT DOCUMENTS

| | | | | |
|---|---|---|---|---|
| 3,043,129 | A * | 7/1962 | King | 73/40 |
| 3,101,918 | A | 8/1963 | Evelyn et al. | |
| 3,375,771 | A * | 4/1968 | Balcom, Jr. | 454/74 |
| 4,203,566 | A * | 5/1980 | Lord | 244/57 |
| 4,262,495 | A * | 4/1981 | Gupta et al. | 62/402 |
| 5,327,744 | A * | 7/1994 | Frawley et al. | 62/401 |
| 5,490,645 | A * | 2/1996 | Woodhouse | 244/118.5 |
| 5,516,330 | A * | 5/1996 | Dechow et al. | 454/74 |
| 5,934,614 | A * | 8/1999 | Mueller et al. | 244/118.5 |
| 6,305,156 | B1 * | 10/2001 | Lui | 60/785 |
| 6,634,597 | B2 * | 10/2003 | Johnson et al. | 244/118.5 |
| 6,681,592 | B1 * | 1/2004 | Lents et al. | 62/401 |
| 6,837,038 | B2 * | 1/2005 | Eiler et al. | 60/226.1 |
| 6,850,164 | B2 * | 2/2005 | Olmsted | 340/605 |
| 6,868,664 | B2 * | 3/2005 | Albero et al. | 60/224 |
| 6,945,278 | B2 * | 9/2005 | Bunn et al. | 137/899.2 |
| 7,014,144 | B2 * | 3/2006 | Hein et al. | 244/53 B |
| 7,364,116 | B2 * | 4/2008 | Nguyen et al. | 244/58 |
| 7,600,714 | B2 * | 10/2009 | Sheoran et al. | 244/53 B |
| 7,673,459 | B2 * | 3/2010 | Sheldon et al. | 60/782 |
| 7,690,595 | B2 * | 4/2010 | Leland et al. | 244/53 B |
| 7,727,057 | B2 * | 6/2010 | Beier et al. | 454/76 |
| 7,982,328 | B2 * | 7/2011 | Huntemann | 290/55 |
| 8,322,981 | B2 * | 12/2012 | Light et al. | 415/183 |
| 8,336,821 | B2 | 12/2012 | Shell et al. | |
| 8,387,440 | B2 * | 3/2013 | Rivot | 73/40 |
| 8,439,061 | B2 * | 5/2013 | Baumann | 137/15.1 |
| 8,511,179 | B2 * | 8/2013 | Kelnhofer et al. | 73/861.351 |
| 8,516,826 | B2 * | 8/2013 | Rostek et al. | 60/782 |
| 8,973,867 | B2 * | 3/2015 | Eichholz et al. | 244/53 B |
| 2003/0132344 | A1 | 7/2003 | Johnson et al. | |
| 2005/0151017 | A1 * | 7/2005 | Noiseux et al. | 244/129.2 |
| 2007/0144597 | A1 | 6/2007 | Cazenave et al. | |
| 2007/0298931 | A1 * | 12/2007 | Trumper et al. | 477/92 |
| 2008/0315043 | A1 | 12/2008 | Baumann | |
| 2009/0044800 | A1 * | 2/2009 | Jorn | 128/203.12 |
| 2010/0071881 | A1 * | 3/2010 | Murer et al. | 165/104.33 |
| 2010/0147399 | A1 * | 6/2010 | Buhring | 137/468 |
| 2011/0151763 | A1 * | 6/2011 | Selchert et al. | 454/76 |

FOREIGN PATENT DOCUMENTS

| | | |
|---|---|---|
| DE | 102007010268 | 9/2008 |
| EP | 0343020 | 11/1989 |
| EP | 1188666 | 3/2002 |
| EP | 1595788 | 11/2005 |
| GB | 534524 | 3/1941 |
| JP | 2004268617 | 9/2004 |
| JP | 2008534376 | 8/2008 |
| RU | 2006106724 | 8/2006 |
| WO | 2007054206 | 5/2007 |

OTHER PUBLICATIONS

Russian Patent Office; Office Action (3 pgs.); Mar. 2013.
European Patent Office, International Search Report, Form PCT/ISA/210 (4 pgs.), and Written Decision of the International Search Authority, Form PCT/ISA/237 (6 pgs.), Dec. 3, 2009.
Chinese Intellectual Property Office; Office Action (6 pgs.) and English Language Translation Summary (1 pg.); Feb. 18, 2013.
Japanese Patent Office; Office Action, Japanese (3 pgs.) (partial English language 2 pgs.); Oct. 8, 2013.
The Federal Survice for Intellectual Property, Patents and Trademarks (Rospatent), Decision on Granting a Patent for Invention, (English language translation, 4 pgs.), Oct. 29, 2013.

* cited by examiner

METHOD AND SYSTEM FOR EMERGENCY VENTILATION OF AN AIRCRAFT CABIN IN THE CASE OF A LEAK IN THE AREA OF AN AIR MIXER

This application claims priority under Section 371 and /or as a continuation under Section 120 to PCT Application No. PCT/EP2009/006510, filed on Sep. 8, 2009, which claims priority to German Application No. 10 2008 058 451.17 and U.S. Provisional Application No. 61/116,676, both filed on Nov. 21, 2008.

TECHNICAL FIELD

The invention relates to a method and a system for emergency ventilation of an aircraft cabin in the case of a leak in the area of an air mixer of the aircraft air conditioning system.

BACKGROUND

Currently in commercial aircraft so-called air-assisted air conditioning systems are conventionally used to air-condition the aircraft cabin. The aircraft air conditioning system is used to cool the aircraft cabin, which would otherwise become overheated as a result of thermal loads, such as for example insolation, body heat of the passengers and waste heat from equipment on board the aircraft. The aircraft air conditioning system moreover supplies enough fresh air into the aircraft cabin to ensure that there is a prescribed minimum oxygen content in the aircraft cabin. Finally, the aircraft air conditioning system is used during cruising of the aircraft above a specific altitude to keep the pressure in the aircraft cabin at a level higher than the ambient pressure.

In an aircraft air conditioning system known for example from DE 10 2006 016 541 A1, hot process air that is tapped from the aircraft engines during cruising of the aircraft is supplied to two air conditioning units, which are operable independently of one another. In the air conditioning units the process air, which is supplied at a high temperature and a high pressure, is conditioned in such a way that it leaves the air conditioning units as expanded and cooled process air. The expanded and cooled process air is supplied as fresh air to a mixer, in which it is mixed with recirculation air removed from the aircraft cabin. The recirculation air is conventionally conveyed by recirculation fans from the aircraft cabin into the mixer. The air mixture of fresh air and recirculation air that is produced in the mixer is finally conveyed into the aircraft cabin to ventilate the aircraft cabin.

If in flight a defect in the aircraft air conditioning system arises, as a result of which the aircraft cabin can no longer be supplied with sufficient fresh air, the aircraft drops to a safe altitude, at which it is no longer necessary to keep the pressure in the aircraft cabin at a level higher than the ambient pressure, and flies in an unpressurized state to the destination airport and/or to a less remote airfield. In order to provide the necessary breathable air for the passengers during this period, it is known to provide aircraft with one or more emergency ram-air inlets. By suitably controlling emergency ram-air inlet flaps, which during normal operation of the aircraft close the emergency ram-air inlets, it is possible to ensure that ram air from the aircraft environment is supplied through the emergency ram-air inlets and fed as fresh air into the mixer of the aircraft air conditioning system.

A fault scenario, in which a leak is generated, for example by detached rotor parts or the like, in the area of the mixer of the aircraft air-conditioning system, is to be categorized as extremely problematical. In the event of a leak in the area of the mixer, air escapes from the mixer into an aircraft area adjacent to the mixer. This leads to a pressure drop in the mixer, with the result that it is no longer possible to discharge enough air from the mixer into the aircraft cabin. The pressure drop in the mixer leads to a temporary rapid increase of the air-mass flow from the air conditioning units because of the diminishing mixer back-pressure. The controller of the air conditioning units then reduces the air-mass flow out of the air conditioning units, thereby leading to a further drop of the mixer pressure. A further effect of the pressure drop in the mixer is that the recirculation fans suck air out of the mixer instead of out of the aircraft cabin. A short-circuit in the recirculation air system consequently arises, as a result of which the recirculation air flow also breaks down.

In the fault scenario of a leak in the area of the mixer, therefore, neither enough fresh air from the air conditioning units nor enough recirculation air is directed into the aircraft cabin.

In the case of a leak in the area of the mixer, the fresh air supply through the emergency ram-air inlets is similarly unable to guarantee an adequate supply of fresh air to the aircraft cabin because the fresh air supplied through the emergency ram-air inlets is distributed in the cabin by means of the mixer. Consequently, the fresh air supplied through the emergency ram-air inlets also escapes unused into the surroundings of the mixer in the underfloor area of the aircraft. A leak in the area of the mixer of the aircraft air conditioning system may therefore lead, particularly in aircraft, in which no cockpit- or cabin window may be opened, to the $CO_2$ content of the cabin air rising to a level that is injurious to health.

SUMMARY OF THE INVENTION

The underlying object of the invention is to provide a method and a system for emergency ventilation of an aircraft cabin that guarantee an adequate supply of fresh air to the aircraft cabin also in the case of a leak in the area of an air mixer of the aircraft air conditioning system.

In order to achieve this object, in a method according to the invention for emergency ventilation of an aircraft cabin in a first step the presence of a leak in the area of an air mixer of an aircraft air conditioning system is detected. The leak in the area of the air mixer of the aircraft air conditioning system may be for example a leak caused by a detached rotor part or the like. The leak detection and/or leak identification may be carried out for example by an electronic control unit on the basis of signals that are communicated to the electronic control unit by sensors that are in any case provided in the aircraft air conditioning system. The sensors may be for example pressure sensors disposed in various areas of the aircraft air conditioning system, so that the electronic control unit may detect a leak in the area of the air mixer of the aircraft air conditioning system on the basis of the pressure developments that are characteristic of such a fault scenario in the various areas of the aircraft air conditioning system. In addition or alternatively thereto the sensors, the signals of which may be utilized to detect a leak in the area of the air mixer of the aircraft air conditioning system, may be sensors that measure a fresh air-mass flow from an air conditioning unit of the aircraft air conditioning system to the air mixer, a recirculation air-mass flow and/or a mixed air-mass flow conveyed from the air mixer into the aircraft cabin.

As explained above, in the event of a leak in the area of the air mixer of the aircraft air conditioning system air escapes from the mixer into an aircraft area adjacent to the mixer. If, as is generally customary in modern commercial aircraft, the air mixer of the aircraft air conditioning system is situated in the underfloor area of the aircraft, the air consequently escapes from the mixer into a portion of the underfloor area of the aircraft that surrounds the mixer and is no longer supplied to the aircraft cabin. In the emergency ventilation method according to the invention, therefore, an emergency air flap, which in a closed position prevents an air exchange between the aircraft area adjacent to the air mixer and the aircraft cabin, is controlled into an open position. The emergency air flap may be controlled with the aid of the electronic control unit that also effects the detection of the leak in the area of the air mixer. This may be for example the central control unit of the aircraft air conditioning system. However, separate electronic control units may alternatively be provided for leak detection and control of the emergency air flap.

Air from the aircraft area adjacent to the air mixer is further conveyed through the open emergency air flap into the aircraft cabin. In other words, the emergency ventilation method according to the invention ensures that the air escaping from the air mixer of the aircraft air conditioning system does not remain unused but is supplied through the emergency air flap to its original destination, the aircraft cabin. Thus, even in aircraft, in which no cockpit- or cabin window may be opened, by means of the emergency ventilation method according to the invention an adequate supply of fresh air to the aircraft cabin may be guaranteed also in the event of a leak in the area of the air mixer of the aircraft air conditioning system. Furthermore, with the method according to the invention for emergency ventilation of an aircraft cabin the desired conveying of air from the aircraft area adjacent to the air mixer into the aircraft cabin is not impaired even by damage to the aircraft skin in the area around the air mixer, because during cruising of the aircraft the external pressure upon the damaged aircraft skin is high enough to prevent any air from escaping from the aircraft area adjacent to the air mixer into the aircraft environment.

In principle, the air that escapes because of a leak in the area of the air mixer from the air mixer into the aircraft area adjacent to the air mixer may be conveyed by any suitable conveying device from the aircraft area adjacent to the air mixer into the aircraft cabin. For example, in the aircraft area adjacent to the air mixer a fan or a blower may be provided, which if need be may be used to convey air from the aircraft area adjacent to the air mixer through the open emergency air flap into the aircraft cabin. The conveying device may be controlled with the aid of the control device that also effects leak detection in the area of the air mixer and/or control of the emergency air flap. However, a separate control device may alternatively be provided for controlling the conveying device.

In a preferred form of implementation of the emergency ventilation method according to the invention, however, an air outlet valve of an aircraft cabin pressure control system may be controlled into an open position in such a way as to generate in an area of the aircraft adjacent to the air outlet valve a pressure that is lower than the pressure in the aircraft area adjacent to the air mixer. This is possible for example in an operating state of the air outlet valve, in which the air outlet valve configured in the form of a flap is 50% open. For example, at a cruising speed of the aircraft of 0.5 Mach a partial vacuum of −0.1 cp relative to the aircraft ambient pressure may be generated in an aircraft area that is adjacent to an air outlet valve opened to a flap aperture of 50%. If the aircraft cabin pressure control system of the aircraft comprises a plurality of air outlet valves, in the emergency ventilation method according to the invention preferably an air outlet valve that is disposed in a stern fuselage area of the aircraft is opened.

As the aircraft area adjacent to the air outlet valve of the aircraft cabin pressure control system is usually separate from the aircraft area surrounding the air mixer, the purposeful adjustment of a partial vacuum in the aircraft area adjacent to the air outlet valve by means of corresponding control of the open state of the air outlet valve enables the generation of a partial-vacuum-driven air flow from the aircraft area adjacent to the air mixer into the aircraft cabin. After flowing through the aircraft cabin, the air is finally sucked out of the aircraft cabin into the aircraft area adjacent to the air outlet valve and removed through the open air outlet valve into the aircraft environment. The air flow from the aircraft cabin into the aircraft area adjacent to the air outlet valve may be effected for example through air outlet is openings that are formed in a floor separating the aircraft cabin from the underfloor area of the aircraft and/or in side walls of the aircraft cabin. The air outlet valve of the aircraft cabin pressure control system may be controlled with the aid of the control unit that is also used to detect the leak in the area of the air mixer of the aircraft air conditioning system and/or to control the emergency air flap. However, a separate electronic control unit or an electronic control unit of the aircraft cabin pressure control system may alternatively be included in the method according to the invention for emergency ventilation of an aircraft cabin and be used to control the air outlet valve.

The partial-vacuum-driven conveying of air from the aircraft area surrounding the air mixer into the aircraft cabin by means of corresponding control of the air outlet valve of the aircraft cabin pressure control system makes it possible to dispense with a separate conveying device. A saving of weight and installation space may therefore be realized. The reliability of the emergency ventilation system is moreover increased because it is possible to preclude the situation where in the event of a fault the separate conveying device is also damaged and is consequently no longer available for operation.

If one air conditioning unit of the aircraft air conditioning system is not affected by the defect caused for example by a detached rotor part and is therefore still available for operation, the air conditioning unit is preferably controlled in such a way that a maximum air-mass flow is generated by the air conditioning unit and supplied to the air mixer. If both air conditioning units of the aircraft air conditioning system are still available for operation, preferably both air conditioning units are controlled in such a way that they generate a maximum air-mass flow and supply it to the air mixer. This ensures that in the air mixer and in particular in the aircraft area adjacent to the air mixer there is enough air to supply into the aircraft cabin.

An emergency ram-air inlet flap may moreover be controlled into an open position, so that aircraft ambient air may be supplied through an emergency ram-air inlet to the air mixer. If a plurality of emergency ram-air inlets are provided, preferably all of the emergency ram-air inlet flaps are controlled into their open position. The supply of aircraft ambient air into the air mixer through an emergency ram-air inlet is particularly important if both air conditioning units of the aircraft air conditioning system have failed. An ambient air supply through an emergency ram-air inlet is however conceivable also in the ready-to-operate state of the air conditioning units of the aircraft air conditioning system, for example in order to ensure an additional air supply into the air mixer and in particular into the aircraft area adjacent to the air mixer. Control of the air conditioning units of the aircraft air conditioning system and the emergency ram-air inlet flap of the emergency ram-air inlet may be effected with the aid of the control unit that is also used to detect the leak in the area of the air mixer and/or to control the emergency air flap. However, operation of the air conditioning units and the emergency ram-air inlet flap may alternatively be controlled by (a) separate control unit(s).

In a preferred form of implementation of the method according to the invention for emergency ventilation of an aircraft cabin, the recirculation fans of the aircraft air conditioning system are moreover controlled in such a way their operation is interrupted. Consequently, the pressure in the area of the air mixer that counteracts the supply of air from the air conditioning units and the emergency ram-air inlet into the air mixer may be reduced. This further prevents the recirculation fans, under corresponding pressure conditions, from sucking air out of the air mixer. The recirculation fans may be controlled with the aid of the electronic control unit that is also used to detect leaks in the area of the air mixer and/or to control the emergency air flap. However, operation of the recirculation fans may alternatively be controlled by a separate control unit.

The emergency air flap is preferably disposed in a cabin trim panel or formed by a cabin trim panel. The cabin trim panel may be for example a dada panel of the aircraft cabin trim. Naturally, a plurality of emergency air flaps may also be provided. For example, some or all of the dado panels of the aircraft cabin trim may be configured as emergency air flaps. The dado panels may for example be movably disposed so that in a closed position they prevent an air exchange between the aircraft area adjacent to the air mixer and the aircraft cabin and in an open position they enable the supply of air from the aircraft area adjacent to the air mixer into the aircraft cabin.

A system according to the invention for emergency ventilation of an aircraft cabin comprises an electronic control unit, which is adapted to detect a leak in the area of an air mixer of an aircraft air conditioning system and to control an emergency air flap, which in a closed position prevents an air exchange between an aircraft area adjacent to the air mixer and the aircraft cabin, into an open position. The emergency ventilation system according to the invention further comprises a device for conveying air from the aircraft area adjacent to the air mixer through the open emergency air flap into the aircraft cabin. By means of the emergency ventilation system according to the invention a proper ventilation of the aircraft cabin may be guaranteed even in a fault scenario, in which the air mixer of the aircraft air conditioning system is damaged so that air escapes from the air mixer into the aircraft area adjacent to the air mixer.

The device for conveying air from the aircraft area adjacent to the air mixer into the aircraft cabin preferably comprises an air outlet valve of an aircraft cabin pressure control system that is adapted to be controlled into an open position in such a way as to generate in an area of the aircraft adjacent to the air outlet valve a pressure that is lower than the pressure in the aircraft area adjacent to the air mixer. As the area of the aircraft adjacent to the air outlet valve is separate from the aircraft area adjacent to the air mixer, by means of a corresponding opening of the air outlet valve a partial-vacuum-driven air flow from the aircraft area adjacent to the air mixer, via the aircraft cabin into the aircraft area adjacent to the air outlet valve may be generated. There is therefore no need to provide a separate conveying device for conveying air from the aircraft area adjacent to the air mixer into the aircraft cabin.

The emergency ventilation system according to the invention may further comprise an electronic control unit, which is adapted to control an air conditioning unit of the aircraft cabin in such a way a maximum air-mass flow is generated by the air conditioning unit and supplied to the air mixer. If both air conditioning units of the aircraft air conditioning system are still available for operation, the electronic control unit is preferably devised to control both air conditioning units in such a way that a maximum air-mass flow is generated by the air conditioning units and supplied to the air mixer.

The emergency ventilation system according to the invention may further comprise an electronic control unit, which is adapted to control an emergency ram-air inlet flap into an open position so that aircraft ambient air may be supplied through an emergency ram-air inlet to the air mixer.

An electronic control unit may further be provided, which is adapted to control recirculation fans of the aircraft air conditioning system in such a way that their operation is interrupted.

The electronic control unit of the emergency ventilation system according to the invention that is used to detect a leak in the area of the air mixer and/or to control the emergency air flap may also be used to control the air conditioning unit/air conditioning units of the aircraft air conditioning system, the emergency ram-air inlet flap and/or the recirculation fans. For example, this electronic control unit may be the central control unit of the aircraft air conditioning system. Where desirable or necessary, however, separate electronic control units may alternatively be used to detect leaks, control the emergency air flap, control the air conditioning unit/air conditioning units, control the emergency ram-air inlet flap and/or control the recirculation fans. Control of the air outlet valve of the aircraft cabin pressure control system may further be effected by the electronic control unit that is also used to detect a leak in the area of the air mixer and/or to control the emergency air flap. However, a separate electronic control unit or an electronic control unit of the aircraft cabin pressure control system may alternatively form part of the emergency ventilation system according to the invention.

In a preferred form of implementation of the system according to the invention for emergency ventilation of an aircraft cabin, the emergency air flap is disposed in a cabin trim panel or formed by a cabin trim panel. The cabin trim panel may be for example a dado panel of the aircraft cabin trim.

BRIEF DESCRIPTION OF THE DRAWINGS

There now follows a detailed description of a preferred embodiment of the invention with reference to the accompanying diagrammatic drawings, of which

DETAILED DESCRIPTION

Figure 1:
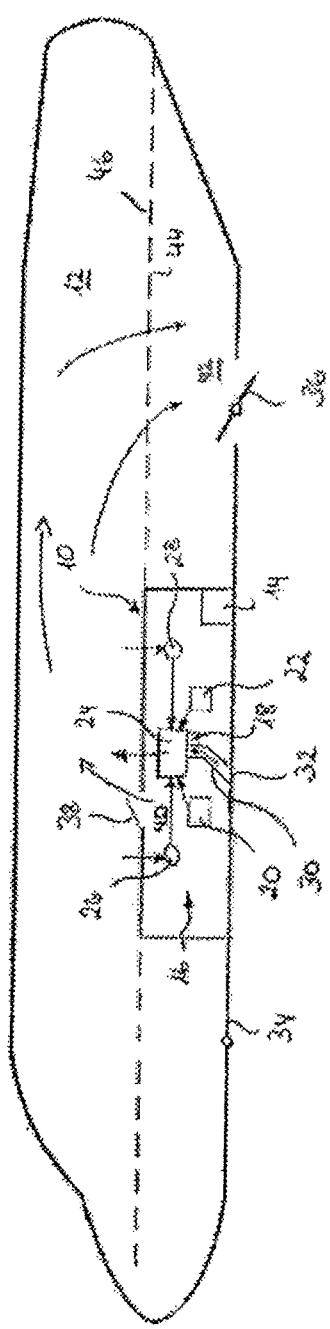
FIG. 1 shows an overview representation of a system for emergency ventilation of an aircraft cabin.

FIG. 1 shows a system 10 for emergency ventilation of an aircraft cabin 12. Here, by the term aircraft cabin 12 is meant any area of the aircraft that during normal operation of the aircraft is to be ventilated, such as for example a cockpit, a passenger cabin, crew areas and cargo holds that are to be ventilated. The emergency ventilation system 10 comprises an electronic control unit 14, which receives signals from a plurality of sensors 18 disposed in the area of an aircraft air conditioning system 16. The sensors 18 are used to measure the pressure and the air-mass flows in various areas of the aircraft air conditioning system 16.

The aircraft air conditioning system 16 comprises two air conditioning units 20, 22 that are operable independently of one another. In the air conditioning units 20, 22 hot bleed air, which is supplied to the air conditioning units 20, 22 from the engines of the aircraft, is conditioned in such a way that it leaves the air conditioning units 20, 22 as expanded and cooled process air. The expanded and cooled process air is supplied as fresh air to a central mixer 24. In the mixer 24 the fresh air from the air conditioning units 20, 22 is mixed with recirculation air, which recirculation fans 26, 28 convey from the aircraft cabin 12 into the mixer 24. The air mixture of fresh air and recirculation air that is produced in the mixer 24 is finally directed by an air distribution system (not represented in FIG. 1) into the aircraft cabin 12.

The mixer 24 of the aircraft air conditioning system 16 is further connected to an emergency ram-air inlet 30. During normal operation of the aircraft the emergency ram-air inlet 30 is closed by means of an emergency ram-air inlet flap 32, which is disposed in the region of the aircraft skin. When the emergency ram-air inlet flap 32 is open, ram air from the aircraft environment may be directed through the emergency ram-air inlet 30 into the mixer 24 of the aircraft air conditioning system 16. Operation of the emergency ram-air inlet flap 32 is controlled by the electronic control unit 14.

FIG. 1 further shows a first and a second air outlet valve 34, 36 of an aircraft cabin pressure control system. During normal operation of the aircraft the air outlet valves 34, 36 are used, as the altitude of the aircraft drops, to ensure a pressure equalization between the aircraft environment and an aircraft area that, from a specific altitude of the aircraft up, is kept at a higher pressure than the ambient pressure. The air flow from the aircraft cabin 12 in the direction of the second air outlet valve 36 is effected through air outlet openings 44, which are formed in a floor 46 that separates the aircraft cabin 12 from the underfloor area of the aircraft. The first air outlet valve 34 is disposed in a bow area of the fuselage, while the second air outlet valve 36 is situated in a stern region of the fuselage. In other words, along a longitudinal axis of the aircraft the second air outlet valve 36 is further away from a nose of the aircraft than the first air outlet valve 34.

Figure 2A:
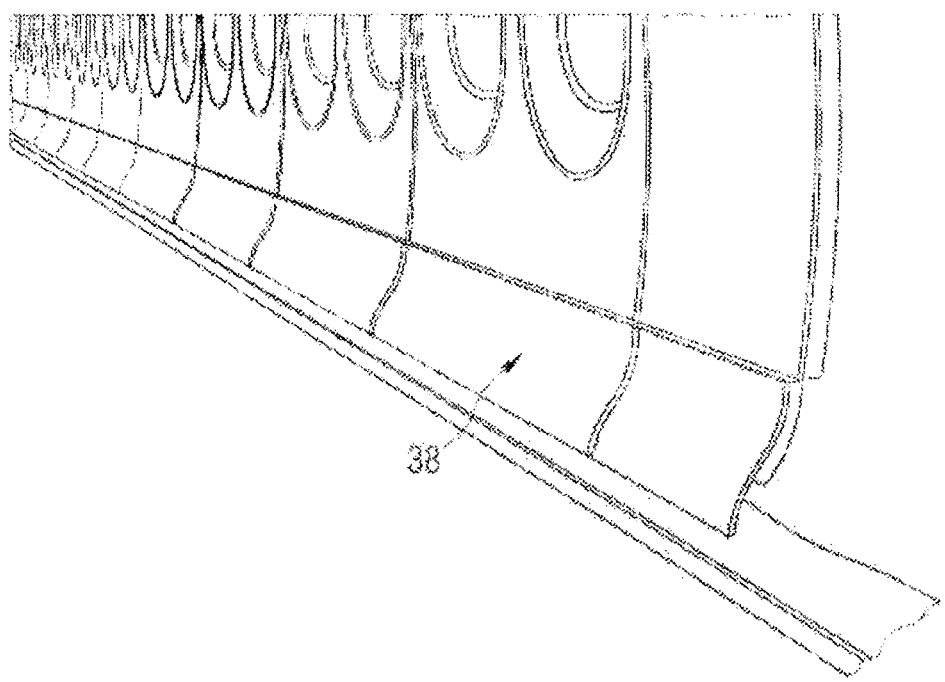
FIGS. 2a and 2b show dado panels of an aircraft cabin trim that are used as emergency air flaps in an emergency ventilation system according to FIG. 1.
Figure 2B:
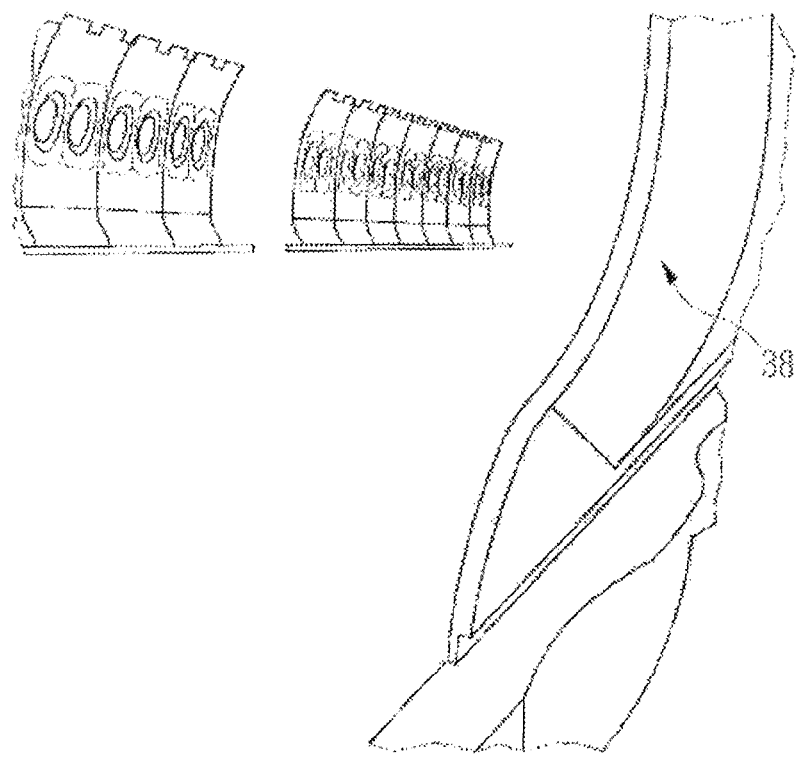

The emergency ventilation system 10 finally comprises a plurality of emergency air flaps 38, which in FIG. 1 are merely diagrammatically indicated and which in a closed position prevent an air exchange between an aircraft area 40 adjacent to the air mixer 24 and the aircraft cabin 12. As is evident from FIGS. 2a and 2b, the emergency air flaps 38 are formed by dado panels of the aircraft cabin trim. The dado panels are movable between their closed position, in which they prevent an air exchange between the aircraft area 40 adjacent to the mixer 24 in the underfloor area of the aircraft and the aircraft cabin 12, and an open position. In their open position the dado panels enable the supply of air from the aircraft area 40 adjacent to the mixer 24 into the aircraft cabin 12. Operation of the emergency air flap 38, like operation of the emergency ram-air inlet flap 32, is controlled by the electronic control unit 14. The electronic control unit 14 is further used to control operation of the air conditioning units 20, 22, the recirculation fans 26, 28 and the air outlet valves 34, 36.

There now follows a description of the operation of the emergency ventilation system 10. In a fault scenario, in which a leak is produced, for example by a detached rotor part or the like, in the area of the mixer 24 of the aircraft air conditioning system 16, air escapes from the mixer 24 into the aircraft area 40 adjacent to the mixer 24. This leads to a pressure drop in the mixer 24, with the result that sufficient air may no longer be discharged from the mixer 24 into the aircraft cabin 12. The pressure drop in the mixer 24 causes a temporary rapid increase of the air-mass flow from the air conditioning units 20, 22 because of the diminishing mixer back-pressure. The air-mass flow from the air conditioning units 20, 22 is then reduced, thereby leading to a further drop in the mixer pressure. A further effect of the pressure drop in the mixer 24 is that the recirculation fans 26, 28 suck air out of the mixer 24 instead of out of the aircraft cabin 12. A short-circuit in the recirculation air system of the aircraft air conditioning system 16 therefore arises, as a result of which the recirculation air flow into the mixer 24 also breaks down. This development of the pressure conditions and the air-mass flows in the various areas of the air conditioning system 16 is detected by the sensors 18. Consequently, the electronic control unit 14 on the basis of the signals communicated to it by the sensors 18 is able to detect the presence of a leak in the area of the air mixer 24 of the aircraft air conditioning system 16.

In response to the detection of a leak in the area of the air mixer 24, the electronic control unit 14 controls the emergency air flaps 38 into their open state. This allows air escaping from the mixer 24 to flow out of the aircraft area 40 adjacent to the mixer 24 into the aircraft cabin 12. In order to convey the air from the aircraft area 40 adjacent to the mixer 24 into the aircraft cabin 12, the electronic control unit 14 controls the second air outlet valve 36 into an open state, in which the second air outlet valve 36 configured in the form of a flap is 50% open. As a result, in an aircraft area 42 adjacent to the second air outlet valve 36 a pressure that is lower than the pressure in the aircraft area 40 adjacent to the air mixer 24 is generated.

Since, as is diagrammatically indicated in FIG. 1, the aircraft area 42 adjacent to the second air outlet valve 36 is separate from the aircraft area 40 adjacent to the mixer 24 of the air conditioning system 16, the previously described pressure control in the aircraft area 42 adjacent to the second air outlet valve 36 enables a partial-vacuum-driven air flow from the aircraft area 40 adjacent to the mixer 24 into the aircraft cabin 12 and from the aircraft cabin 12 into the aircraft area 42 adjacent to the second air outlet valve 36. The air flow from the aircraft cabin 12 into the aircraft area 42 adjacent to the second air outlet valve 36 is effected through the air outlet openings 44 formed in the floor 46. It is therefore possible to dispense with a separate device for conveying air from the aircraft area 40 adjacent to the mixer 24 into the aircraft cabin 12.

If one of the air conditioning units 20, 22 of the air conditioning system 16 is still available for operation, the electronic control unit 14 controls this air conditioning unit 20, 22 in such a way that a maximum air flow is generated by the air conditioning unit 20, 22 and supplied to the air mixer 24. If both air conditioning units 20, 22 are still available for operation, both air conditioning units 20, 22 are controlled by the electronic control unit 14 in such a way that a maximum air-mass flow is generated by the air conditioning units 20, 22 and supplied to the air mixer 24. This ensures that in the mixer 24 and in particular in the aircraft area 40 adjacent to the mixer 24 there is enough air available for supply into the aircraft cabin 12.

If none of the air conditioning units 20, 22 is still available for operation, the electronic control unit 14 controls the emergency ram-air inlet flap 32 into an open position. Air from the aircraft environment may therefore be directed through the emergency ram-air inlet 30 into the air mixer 24.

Finally, the electronic control unit 14 controls the recirculation fans 26, 28 in such a way that their operation is interrupted. As a result, in the area of the mixer 24 a pressure that counteracts the supply of fresh air from the air conditioning units 20, 22 or through the emergency ram-air inlet 30 into the mixer 24 is reduced. This further prevents the recirculation fans 26, 28 from sucking air out of the mixer 24.

The invention claimed is:

1. A method for emergency ventilation of an aircraft cabin in an aircraft, comprising:
    detecting a leak in the area of an air mixer of an aircraft air conditioning system, through which air escapes from the air mixer into an aircraft area, the aircraft area being adjacent to the air mixer and within the aircraft,
    electronically controlling an emergency air flap, which in a closed position prevents an air exchange between the aircraft area adjacent the air mixer and the aircraft cabin, into an open position, which allows air escaping from the air mixer to flow out of the aircraft area adjacent the air mixer into the aircraft cabin, and
    conveying air from the aircraft area adjacent the air mixer through the open emergency air flap into the aircraft cabin.

2. The method according to claim 1, further comprising:
    controlling an air outlet valve of an aircraft cabin pressure control system into an open position in such a way as to generate in another area of the aircraft that is adjacent to the air outlet valve a pressure that is lower than the pressure in the aircraft area.

3. The method according to claim 1, further comprising:
    controlling an air conditioning unit of the aircraft air conditioning system in such a way that a maximum air-mass flow is generated by the air conditioning unit and supplied to the air mixer.

4. The method according to claim 1, further comprising:
    controlling an emergency ram-air inlet flap into an open position so that aircraft ambient air is supplyable through an emergency ram-air inlet to the air mixer.

5. The method according to claim 1, further comprising:
    controlling recirculation fans of the aircraft air conditioning system in such a way that their operation is interrupted.

6. The method according to claim 1, wherein the emergency air flap is disposed in a cabin trim panel or formed by a cabin trim panel.

7. A system for emergency ventilation of an aircraft cabin in an aircraft, comprising:
    an electronic control unit, which detects a leak in the area of an air mixer of an aircraft air conditioning system, through which air escapes from the air mixer into an aircraft area, the aircraft area being adjacent to the air mixer and within the aircraft, and which electronically controls an emergency air flap, which in a closed position prevents an air exchange between the aircraft area adjacent the air mixer and the aircraft cabin, into an open position, which allows air escaping from the air mixer to flow out of the aircraft area adjacent the air mixer into the aircraft cabin, and
    a device that causes air to be conveyed from the aircraft area adjacent the air mixer through the open emergency air flap into the aircraft cabin.

8. The system according to claim 7, wherein the device that causes air to be conveyed from the aircraft area into the aircraft cabin comprises an air outlet valve of an aircraft cabin pressure control system that is adapted to be controlled into an open position in such a way as to generate in another area of the aircraft adjacent to the air outlet valve a pressure that is lower than the pressure in the aircraft area.

9. The system according to claim 7, wherein the electronic control unit is further adapted to control an air conditioning unit of the aircraft air conditioning system in such a way that a maximum air-mass flow is generated by the air conditioning unit and supplied to the air mixer.

10. The system according to claim 7, wherein the electronic control unit is further adapted to control an emergency ram-air inlet flap into an open position so that aircraft ambient air is supplyable through an emergency ram-air inlet to the air mixer.

11. The system according to claim 7, wherein the electronic control unit is further adapted to control recirculation fans of the aircraft air conditioning system in such a way that their operation is interrupted.

12. The system according to claim 7, wherein the emergency air flap is disposed in a cabin trim panel or formed by a cabin trim panel.

* * * * *